US009436586B1

(12) United States Patent
Fagen et al.

(10) Patent No.: US 9,436,586 B1
(45) Date of Patent: Sep. 6, 2016

(54) DETERMINING CODE COVERAGE ON Z/OS® SERVER

(71) Applicant: CA, Inc., Islandia, NY (US)

(72) Inventors: Scott A. Fagen, Frisco, TX (US); Lawrence Backman, Falmouth, MA (US)

(73) Assignee: CA, Inc., New York, NY (US)

( * ) Notice: Subject to any disclaimer, the term of this patent is extended or adjusted under 35 U.S.C. 154(b) by 60 days.

(21) Appl. No.: 14/046,456

(22) Filed: Oct. 4, 2013

(51) Int. Cl.
  G06F 11/00 (2006.01)
  G06F 9/44 (2006.01)
  G06F 11/36 (2006.01)

(52) U.S. Cl.
  CPC .......... *G06F 11/3672* (2013.01); *G06F 11/362* (2013.01); *G06F 11/368* (2013.01); *G06F 11/3684* (2013.01)

(58) Field of Classification Search
  CPC ............... G06F 11/362; G06F 11/368; G06F 11/3692; G06F 11/3684
  See application file for complete search history.

(56) References Cited

U.S. PATENT DOCUMENTS

| 5,050,168 | A  | * | 9/1991 | Paterson ........................ 714/35 |
| 6,170,083 | B1 | * | 1/2001 | Adl-Tabatabai .............. 717/158 |
| 6,754,890 | B1 | * | 6/2004 | Berry et al. .................. 717/128 |
| 7,886,272 | B1 | * | 2/2011 | Episkopos et al. ........... 717/124 |
| 8,839,203 | B2 | * | 9/2014 | Opstad et al. ................ 717/128 |
| 2008/0022262 | A1 | * | 1/2008 | Prakash et al. ............... 717/124 |
| 2013/0111267 | A1 | * | 5/2013 | Beryoza et al. ................ 714/32 |
| 2013/0152043 | A1 | * | 6/2013 | Kuzmin ........................ 717/110 |
| 2014/0229770 | A1 | * | 8/2014 | Klic et al. ....................... 714/45 |

OTHER PUBLICATIONS

Michael D. Ernst; "Static and dynamic analysis: synergy and duality"; MIT Lab for Computer Science; Cambridge, MA 02139; USA; pp. 25-28.

* cited by examiner

*Primary Examiner* — Camquy Truong
(74) *Attorney, Agent, or Firm* — Myers Bigel & Sibley, P.A.

(57) ABSTRACT

In determining code coverage, execution data indicative of portions of a program that have been executed for testing is received. The program is analyzed based on the execution data and a control flow for the program. Based on the analysis, it is determined that additional portions of the program, which are not indicated by the execution data, have also been executed. Related methods, systems, and computer program products are also discussed.

25 Claims, 5 Drawing Sheets

DETERMINING CODE COVERAGE ON Z/OS® SERVER

BACKGROUND

The present disclosure relates to computing systems.

Software quality assurance (QA) generally involves a level of re-testing or regression testing for large parts of an unchanged software system prior to validating that a product is ready for release. Also, as a prelude to testing a large piece of newly written software, it may be valuable to pre-check it by executing it (to the extent possible with automation) "in the large" (i.e., in an intended computing environment) prior to targeting specific trouble areas.

Code coverage is a measure used in software testing that describes the quantity or percentage of the source code of a program has been tested. For example, a software system may be built with testing options or libraries and/or run under a testing environment such that every function of the program that is executed (or "exercised") is traced back to the corresponding instructions in the source code. This may allow developers and/or quality assurance personnel to look for parts of a system that are rarely or never accessed under typical conditions (such as error handling, boundary conditions, and the like), help reassure test engineers that more important conditions (such as mainline functions) have been tested, and/or allow management to make business decisions about quality risks. The resulting output may be analyzed to see what areas of code have not been exercised, and the testing suite may be augmented to include these areas. As such, automated test cases and code coverage tools can be leveraged to show that most or all of a software system has been executed faster and/or more efficiently than a software engineer testing each, function or instruction of a program (also referred to as "single stepping" through the program).

BRIEF SUMMARY

Systems, methods, and computer program products for determining code coverage for a software system are described herein. Embodiments described herein utilize data obtained by sampling executing instructions, which indicates portions of the software system that have been previously executed, to infer or otherwise determine that additional portions of the software system have also been executed.

According to some embodiments, in a method for determining code coverage, execution data indicative of portions of a program that have been executed for testing is received. The data is obtained by sampling executing instructions, and may also be referred to herein as "sample execution data." The program is analyzed based on the sample execution data and based on a control flow for the program. Based on the analysis of the program, it is determined that additional portions of the program, which are not indicated by the sample execution data, have also been executed. The operations of the methods described herein may be performed by at least one processor.

In some embodiments, the testing may include a plurality of test cases. The test cases may not provide 100% execution of all instructions in the program under test. As such, the additional portions of the program may not be specified for execution or may otherwise not be covered by or directly executed in performance of the test cases.

In some embodiments, the portions and the additional portions of the program may be previously-executed instructions and additional instructions, respectively, and the analysis may indicate an ordering of the previously executed instructions in the control flow. Execution of the additional instructions may be inferred based on the ordering of the previously-executed instructions relative to the additional instructions in the control flow. For example if instruction X was executed, and the control flow indicates no branches in the program to X, then it may be inferred that instruction X−1 must also have executed.

In some embodiments, the program may be one of a plurality of programs. The sample execution data may be included in a file, which may further include program mapping data identifying one of the programs or a function thereof corresponding to one of the previously-executed instructions indicated by the sample execution data. The control flow for the one of the programs or the function thereof indicated by the program mapping data may be selected among the plurality of programs, and may be analyzed to determine the ordering of the one of the previously-executed instructions therein.

In some embodiments, the file may be received from an instrumentation device that is external to the processor. The instrumentation device may be configured to collect the sample execution data from the processor, generate the mapping data, and merge the sample execution data with the mapping data to create the file. In some embodiments, prior to the analysis of the control flow, an assembler listing compiled from source code for the one of the programs identified by the program mapping data may be received. The assembler listing may be indicative of the control flow.

In some embodiments, the sample execution data may be further indicative of a frequency of execution of an instruction path including ones of the previously-executed instructions relative to others of the previously-executed instructions. The instruction path including the ones of the previously-executed instructions and/or the one of the programs corresponding thereto may be identified as a processing burden and/or a target for optimization based on the relative frequency of execution thereof. As such, embodiments of the present invention may be used for performance analysis.

In some embodiments, the additional instructions are not branch targets. One of the additional instructions may be a branch instruction or other instruction ordered prior to one of the previously-executed instructions in the control flow. Additionally or alternatively, one of the additional instructions may be ordered between consecutive ones of the previously-executed instructions in the control flow. Also, one of the additional instructions may be ordered after one of the previously-executed instructions but prior to a next branch instruction in the control flow.

In some embodiments, the testing may indicate code coverage for the program, and may be performed without modification of the program such that the program as-tested may be the exact executable that is to be delivered to a customer.

In some embodiments, the testing may indicate code coverage for the program, and may be performed without interrupting or otherwise altering execution of the program.

In some embodiments, the operations performed by the processor may reduce a total execution time for the testing of the program, and/or may reduce a business risk associated with a lack of understanding as to untested areas of the program.

In some embodiments, an uncertainty as to execution of another portion the program may be indicated based on the analysis of the control flow and the sample execution data.

A request to alter a granularity of the sample execution data may be transmitted responsive to the uncertainty.

In some embodiments, the program may include executable and non-executable portions. The non-executable portions of the program may be identified or otherwise distinguished among the executable portions thereof, and the non-executable portions of the program may be excluded from the analyzing of the program responsive to the identifying thereof.

It is noted that aspects described with respect to one embodiment may be incorporated in different embodiments although not specifically described relative thereto. That is, all embodiments and/or features of any embodiments can be combined in any way and/or combination. Moreover, other systems, methods, computer program products, and/or articles of manufacture according to embodiments will be or become apparent to one with skill in the art upon review of the following drawings and detailed description. It is intended that all such additional systems, methods, computer program products, and/or articles of manufacture be included within this description, be within the scope of the present disclosure, and be protected by the accompanying claims.

BRIEF DESCRIPTION OF THE DRAWINGS

Aspects of the present disclosure are illustrated by way of example and are not limited by the accompanying figures with like references indicating like elements.

DETAILED DESCRIPTION

Figure 1:
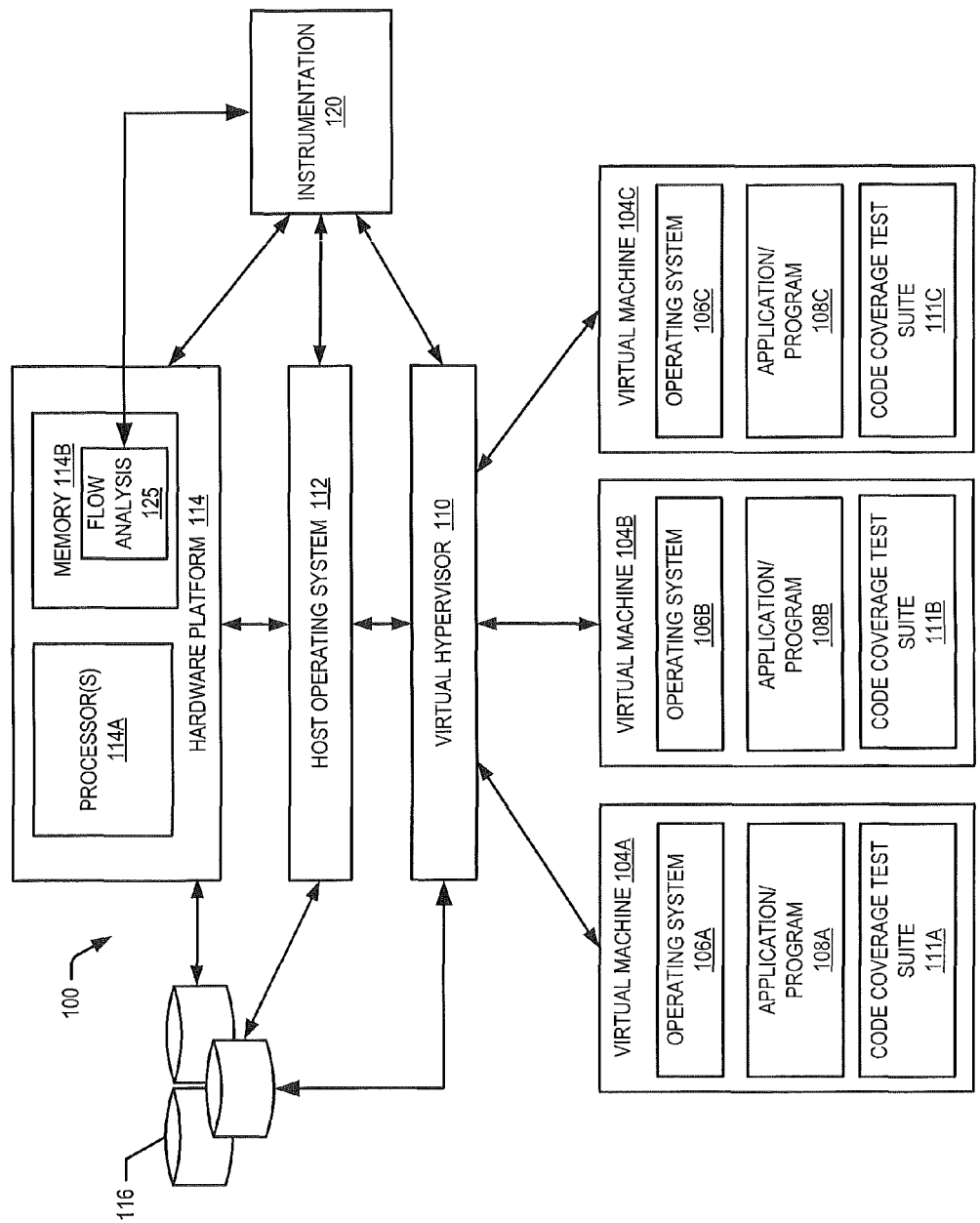
FIG. 1 is a block diagram of a computing system or environment for determining code coverage in accordance with an embodiment of the present disclosure.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system," Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages including program code that may be executed by being compiled or assembled into object code. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks. As used herein, a processor may refer to one processor or multiple processors.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

As described herein, a computing system or environment may include one or more hosts, operating systems, peripherals, and/or applications. Machines in a same computing system or environment may have shared memory or resources, may be associated with the same or different hardware platforms, and/or may be located in the same (e.g., local) or different (e.g., remote) physical locations. Computing environments described herein may refer to a virtualized environment (such as a cloud environment) and/or a physical environment. Machines described herein may refer to physical machines or virtual machines (VMs), which may be managed by one or more virtual hypervisors in some embodiments.

Some embodiments of the disclosure described herein arise from realization that code coverage tools generally incur a computation and logging burden (in addition to that of the actual application program being run), which may slow down the application and/or otherwise negatively affect performance of a CPU or other processor. For example, a typical interrupt-recover-mark-resume code coverage technique used, for example, in a program executing in an IBM System Z® and/or z/OS® computing environment may involve: replacing all executable instructions for the program (or particular "key" instructions identified from analysis of the code) with non-executable operations; placing recovery (i.e., a program interrupt handler) around the execution of the program; and, when the program fails due to one of the non-executable operations, interrupting execution of the program and performing recovery by marking the failed non-executable operation, replacing it with the original/correct executable instruction, and resuming execution of the program with the correct instruction. As such, each recovery for a non-executable operation results in a "mark on the wall" for the corresponding instruction that was replaced thereby. When execution of the program is completed, the collected marks can be compared with all of the executable instructions to determine which of the executable instructions were or were not executed. Also, in some instances (for example, for high level languages), compile-time techniques may use "infiltration" of the program (e.g., adding the "mark on the wall" directives directly into the executable) to obviate the need for the interrupt-recover-mark-resume technique; however, this technique also adds to the processing burden and requires modification of the program code.

Accordingly, some embodiments of the present disclosure collect or gather data obtained by sampling executing instructions (which may capture data indicative of instructions that were previously-executed for testing, using little overhead; also referred to herein as "sample program execution data" or "sample execution data") and direct post-execution analysis based on this sample execution data to interpolate or extrapolate which parts/portions or particular instructions of a software system have been executed over a period of time, using less computational overhead than some traditional code coverage techniques. In particular embodiments, an already-existing (or "built-in") facility in a computing environment may be used to collect or gather the sample execution data. For example, in a System Z® and/or z/OS® system environment, a Hardware Instrumentation Services (HIS) component or module may provide the sample data. In addition, embodiments of the present disclosure may not only gather and determine which instructions have executed, but may also determine also how many times or how often/frequently each instruction or instruction path was executed. As such, some embodiments of the present disclosure can be used to identify "hot spots" corresponding to frequently-executed portions of a program as candidates for performance improvement and/or program optimization. Embodiments of the present disclosure thereby allow for code coverage testing and performance analysis of the exact or same executable that will be delivered to the customer, in a way that is less intrusive or non-intrusive (from a CPU utilization perspective) than typical interrupt/recover/resume methods. Thus, code coverage tools according to embodiments of the present disclosure may be less CPU intensive, and thus, more likely to reduce total execution time (and as such, may be more likely to be used).

FIG. 1 is a block diagram illustrating a computer system 100 for a virtualized computing environment in which the subject matter of the present disclosure can be embodied. Platform virtualization refers to logically dividing a physical machine or hardware platform into multiple virtual machines (VMs) or guests, to consolidate resources, reduce space and energy costs, and to decouple the OS from the physical hardware for added flexibility. Platform virtualization is generally implemented using a hypervisor, which is a software or firmware layer that enables other software (usually operating systems) to run concurrently, as if they had full access to the real machine. The hypervisor controls and presents a machine's physical resources as virtual resources to the VMs, and may also be referred to as a virtual machine monitor (VMM). Although various embodiments are described in the context of a virtualized computing environment, the present disclosure is not limited thereto and may be used for interfacing with software components or applications in non-virtual computer environments.

Referring now to FIG. 1, the computer system 100 generally hosts and manages one or more managed machines (illustrated as virtual machines 104A-104C), each of which runs a guest operating system 106A-106C and one or more software applications or programs 108A-108C. The applications/programs 108A-108C include computer readable program code that is configured to provide a computing product or service. In some instances, the computing needs of users (e.g., humans and/or other virtual/non-virtual machines) may drive the functionality of the machines 104A-104C. For example, where the system 100 is a software testing environment, the machines 104A-104C may, each run a test suite 111A-111C for testing the applications/programs 108A-108C for code coverage, based on one or more test cases or conditions specified by the test suites 111A-111C. A virtual hypervisor 110 can provide an interface between the machines 104A-104C and a host operating system 112 and allow multiple guest operating systems 106A-106C and associated applications 108A-108C to run concurrently. The host operating system 112 handles the operations of a hardware platform 114 capable of implementing the machines 104A-104C. A data storage space 116 may be accessed by the host operating system 112 and is connected to the hardware platform 114.

In some embodiments, the virtual machines 104A-104C may represent logical partitions (LPARs) or subsets of the hardware platform 114, which are virtualized as separate computers. More generally, the hypervisor 110 can partition the hardware platform 114 into multiple logical partitions, each hosting a separate operating system. However, it will be understood that the terminology used for the virtual machines 104A-104C may differ depending on the platform or environment. For example, a virtual machine in an AIX® environment is called a LPAR, while on x86-based systems the term VM may be used. Z®/VM systems use both terms, where LPARs may refer to allocated chunks of the hardware resources 114 in a System Z® computer, and each LPAR can support an independent operating system, one of which can be z/VM itself. So, a z/®VM LPAR can host a Z®/VM guest, which in turn can host different VMs. Also, some such environments may not require the host OS 112, and the hypervisor 110 may run directly on the physical hardware 114.

The hardware platform 114 generally refers to any computer system capable of implementing the machines 104A-104C, which may include, without limitation, a mainframe computer platform, personal computer, mobile computer (e.g., tablet computer), server, wireless communication terminal (e.g., cellular data terminal), or any other appropriate program code processing hardware. The hardware platform 114 may include computer resources such as a processing circuit(s) (e.g., central processing unit, CPU); networking controllers; communication controllers; a display unit; a program and data storage device; memory controllers; input devices (such as a keyboard, a mouse, etc.) and output devices such as printers. The processing hardware may include circuit(s) configured to execute computer program code from memory device(s), described below as a computer readable storage medium, to perform at least some of the operations and methods described herein, and may be any conventional processor circuit(s), such as the AMD Athlon™ 64, or Intel® Core™ Duo.

The hardware platform 114 may be further connected to the data storage space 116 through serial or parallel connections. The data storage space 116 may be any suitable device capable of storing computer-readable data and program code, and it may include logic in the form of software applications, random access memory (RAM), or read only memory (ROM), removable media, or any other suitable memory component. Although some embodiments of the computer system 100 can be configured to operate as a computer server, the computer system 100 is not limited thereto and can be configured to provide other functionality, such as data processing, communications routing, etc.

Besides acting as a host for computing applications that run on the hardware platform 114 in some embodiments, the host operating system 112 may operate at the highest priority level in the system 100 to execute instructions associated with the hardware platform 114, and may have exclusive privileged access to the hardware platform 114. The priority and privileged access of hardware resources affords the host operating system 112 exclusive control over resources and instructions, and may preclude interference with the execution of different application programs or the operating system. The host operating system 112 can create an environment for implementing a virtual machine, hosting the "guest" virtual machines 104A-104C. One host operating system 112 is capable of implementing multiple isolated virtual machines simultaneously.

The virtual hypervisor 110 (or virtual machine monitor/manager VMM) may run on the host operating system 112 and provides an interface between the machines 104A-104C and the hardware platform 114 through the host operating system 112. The hypervisor 110 virtualizes the hardware platform 114 and/or other computer system resources and facilitates the operation of the managed machines 104A-104C. The hypervisor 110 may provide the illusion of operating at the highest priority level to the guest operating systems 106A-106C. However, the virtual hypervisor 110 can also map the guest operating system's priority level to a priority level lower than the topmost priority level. As a result, the virtual hypervisor 110 can intercept the guest operating systems 106A-106C, and execute instructions that require virtualization assistance. Alternatively, the virtual hypervisor 110 may emulate or actually execute the instructions on behalf of the guest operating systems 106A-106C. Software steps permitting indirect interaction between the guest operating systems 106A-106C and the physical hardware platform 114 can also be performed by the virtual hypervisor 110.

Accordingly, when operating in a virtualized environment, the machines 104A-104C present a virtualized environment to the guest operating systems 106A-106C, which in turn provide an operating environment for applications 108A-108C and other software constructs.

Still referring to FIG. 1, the computer system 100 also includes an instrumentation component or module 120. The instrumentation module 120 is configured to monitor or measure the level of performance of the hardware platform 114 and/or application/programs 108A-108C, and may be implemented as a combination of hardware and/or software. For example, in some embodiments, the instrumentation module 120 may include hardware and/or telemetry components separate from or otherwise external to the hardware platform 114, as well as code instructions included in the VMs 104A-104C (for instance, in the operating systems 106A-106C) to monitor the execution of the applications/programs 108A-108C by the processor(s) 114A (for instance, based on test cases or conditions specified by the test suites 111A-111C). The instrumentation module 120 is further configured to output logging information (also referred to herein as sample execution data) confirming that particular portions of the applications/programs 108A-108C have been actually executed by the processor(s) 114A. The instrumentation module 120 may also be configured to generate mapping data that identifies the particular applications/programs 108A-108C to which the sample execution data corresponds. The data collected by the instrumentation module 120 may be limited by the execution coverage of the applications/programs 108A-108C, which may be specified by the test suites 111A-111C. The instrumentation module 120 may also include management tools for coordination/collaboration between the operating system 112, hypervisor 110, and processor(s) 114A. In a System Z® and/or z/OS® system environment, the instrumentation module 120 may be implemented by a hardware facility called Hardware Instrumentation Services (HIS).

The data generated and/or otherwise collected by the instrumentation module 120 is transmitted to an automated flow analysis module or component 125, which is configured to analyze respective control flows for the applications/programs 108A-108C based on the data provided by the instrumentation module 120. In particular, based on the previously-executed portions of the applications/programs 108A-108C indicated or otherwise confirmed by the sample execution data, in combination with knowledge of the branch and flow of the applications/programs 108A-108C, the flow analysis module 125 is configured to interpolate, extrapolate, or otherwise determine that additional portions of the applications/programs 108A-108C (including statements, functions/subroutines, and/or other instructions that are not indicated by the sample execution data) were necessarily executed. For example, if the sample data received from the instrumentation module 120 indicates that a particular instruction X of program 108A was executed for testing by test suite 111A, the flow analysis module 125 can infer that additional branch instructions (other than branch targets) sequentially occurring prior to instruction X in the control flow of program 108A must also have been executed (in order for X to have been executed), and/or that other instructions occurring sequentially between instruction X and the next branch instruction (or the next sample instruction) in the control flow of program 108A must also have been executed (since instruction X was executed), even if such other instructions are not directly exercised or otherwise specified by the test cases/conditions of test suite 111A.

As such, the program execution data collected by the instrumentation module 120 by dynamic program analysis is used to direct the static program analysis performed by the automated flow analysis module 125, to determine that additional portions of the applications/programs 108A-108C (other than those indicated by the sample execution data) must also have been executed. The flow analysis module 125 may also be configured to detect or otherwise distinguish non-executable portions of the applications/programs 108A-108C (such as data files) from the executable portions thereof and exclude such non-executable portions from the analysis. As such, code coverage for the applications/programs 108A-108C may be improved without updating the test suites 111A-111C to specify or otherwise directly execute these additional portions of the applications/programs 108A-108C for testing. The flow analysis module 125 may be implemented as a combination of hardware and/or software, and may include a software component stored in the memory 114B whose operations are carried out by the processor(s) 114A of the hardware platform 114. Alternatively, the flow analysis module 125 may be implemented in one or more of the VMs 104A-104C, or as another VM (in addition to the illustrated VMs 104A-104C) that is managed by the hypervisor 110.

Although illustrated by way of example in FIG. 1 with respect to managed virtual machines 104A-104C in a virtual computing environment, it will be understood that embodiments of the present disclosure may be applied to managed machines in physical computing environments and/or cloud computing environments as well. Also, while illustrated in FIG. 1 with reference to specific functions performed by specific blocks, it will be understood that the functionality of blocks shown herein may be combined, divided, or eliminated.

Figure 2:
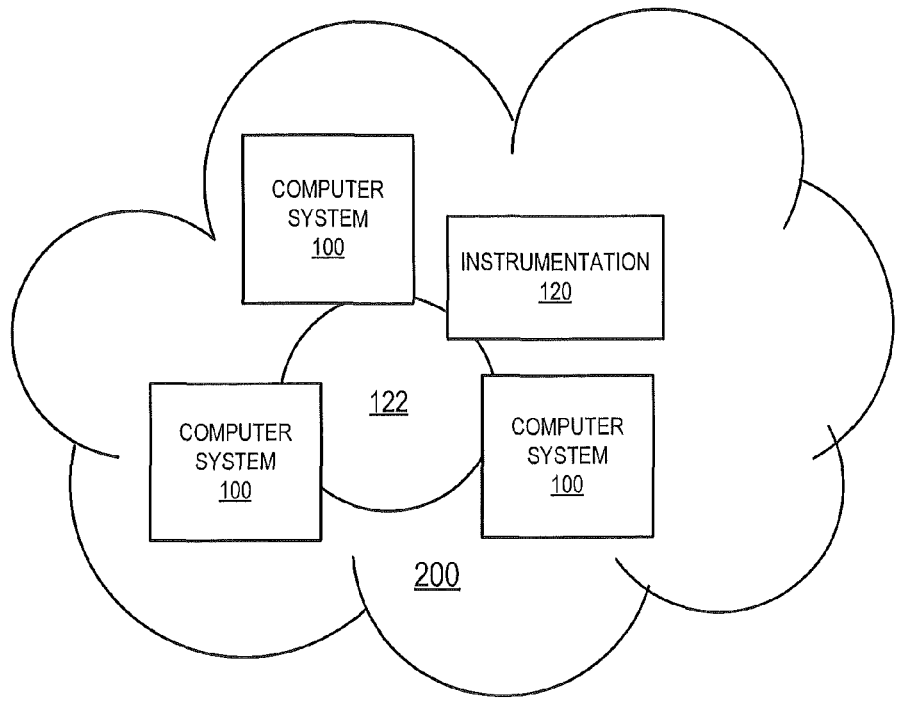
FIG. 2 is a block diagram illustrating a physical layout of a computing environment for determining code coverage in accordance with an embodiment of the present disclosure.

FIG. 2 illustrates an example of a physical layout of a computing environment in accordance with some embodiments of the present disclosure. Referring now to FIG. 2, a computing environment 200 (referred to generally as cloud 200) may include one or more server systems 100 that may include one or more electronic computing devices configured to receive, transmit, process, and store data. For example, the servers in the cloud 200 may include one or more general-purpose personal computers, workstations, server computers, server pools, or any other suitable devices. In certain embodiments, the cloud 200 may include a web server. In short, the cloud 200 may include any suitable combination of software, firmware, and hardware.

The cloud 200 may include a plurality of server systems 100 that are communicatively coupled via a network 122. The network 122 facilitates wireless and/or wireline communication, and may communicate using, for example, IP packets, Frame Relay frames, Asynchronous Transfer Mode (ATM) cells, voice, video, data, and other suitable information between network addresses. The network 122 may include one or more local area networks (LANs), radio access networks (RANs), metropolitan area networks (MANS), wide area networks (WANs), all or a portion of the global computer network known as the Internet, and/or any other communication system or systems at one or more locations. The cloud 200 also includes an instrumentation component 120 (illustrated by way of example as separate from the server systems 100) that is configured to monitor the performance of one or more of the server systems 100 and provide data to a flow analysis component for use in determining code coverage of applications or programs executing on one or more of the server systems 100, as described in greater detail herein. Also, although described in FIG. 2 with reference to "server systems," it will be appreciated that code coverage may be determined for any other suitable computing device in a similar manner.

Figure 3:
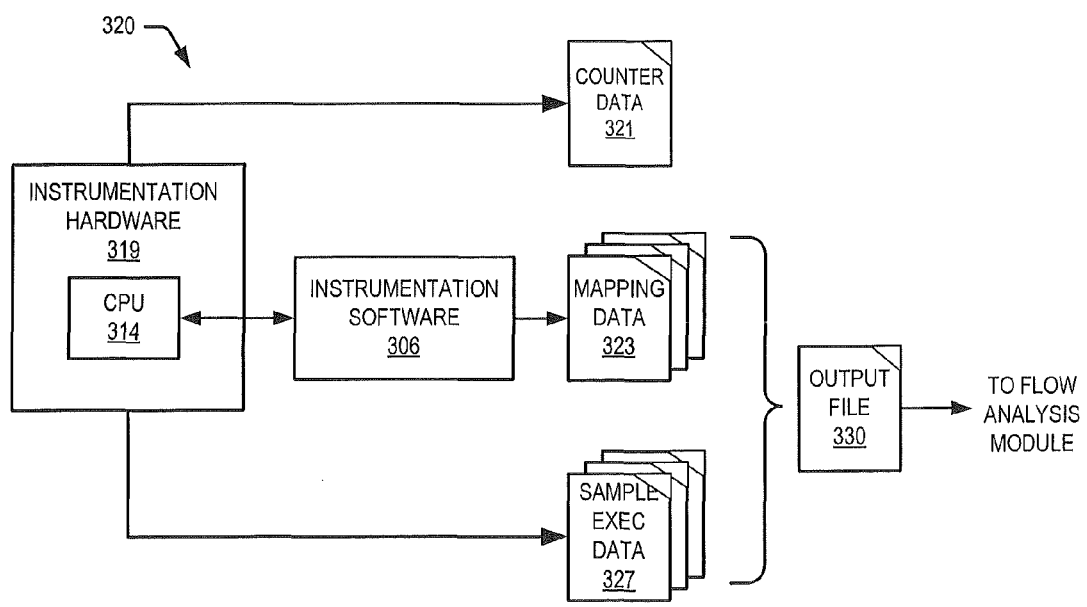
FIG. 3 is a block diagram illustrating a hardware/software architecture for use in determining code coverage in accordance with an embodiment of the present disclosure.

FIG. 3 is a block diagram illustrating an instrumentation module 320 in accordance with some embodiments of the present disclosure. The instrumentation module 320 may correspond to the instrumentation module 120 illustrated in FIGS. 1 and 2 in some embodiments. Referring now to FIG. 3, the instrumentation module 320 includes a hardware component 319 including one or more processors (illustrated by CPU 314) and a software component 306. The instrumentation module 320 is configured to collect or gather information about the applications/programs (or portions or functions thereof) that have been executed over a specified interval in one or more address spaces of selected logical partitions (LPAR) in a computing environment, such as the environment 100 of FIG. 1.

In particular, the instrumentation module 320 is configured to provide, as outputs, a collection of counter data 321 that indicate counts of particular activities, and a collection of sample execution data 327 that provide information about which portions of applications/programs were executed at the time of sampling. The counters 321 may be collected over a longer duration to provide long-term performance data. The samples 327 may be collected over a comparatively short duration, and may identify where resources are being used, for example, to help improve application efficiency. The instrumentation module 320 may run at the LPAR level, such that information gathered by the instrumentation module 320 may pertain to only the specific LPARs selected for instrumentation. For example, counter data 321 may be collected in one LPAR, counter 321 and sample execution data 327 may be collected in another LPAR, and no data may be collected at still another LPAR.

Each sample in the sample execution data 327 may include the instruction address that was being executed at the time of the sample, and the primary address space identifier number (ASID). The sample execution data 327 may also include various state information about the processor(s) executing the applications/programs at the time of each sample. For example, the sample execution data 327 may be marked as being related to problem-state or supervisor-state processor activities, so that application/program activity and system software activity can be independently identified or otherwise distinguished. The sample execution data 327 may allow for improved analysis of program behavior by collecting relatively large amounts of information with little overhead. More particularly, because the sample execution data 327 may have relatively low overhead, a large quantity (i.e., millions) of samples may be collected over a relatively short interval with the use of appropriate sampling intervals. Also, for a given sampling frequency, the overhead of running sampling (as a percentage of the total available capacity) may be reduced as the number of logical CPUs increases (however, the granularity of sampling may decrease as the number of logical CPUs increases). As such, the activity of even relatively infrequently-used code can be observed over the large quantity of samples. In addition, because the sample execution data 327 can be collected even when the processor is not enabled for interrupts, information can be gathered about processing that would otherwise be difficult to monitor.

In some embodiments, the hardware 319 may be responsible for collecting the sample execution data 327, such that the information in the samples 327 may not identify the program(s) being executed or otherwise corresponding to each sample. As such, the software component 306 of the instrumentation module 320 is configured to create mapping data 323 that maps the programs that are resident at each location in virtual storage in each address space. The mapping data 323 may be generated at the end of or otherwise after the sample execution data 327 is collected, and may be saved to an output file 330 along with the sample execution data 327. The output file 330 may be transmitted to a flow analysis component or module, such as the flow analysis module 125 of FIG. 1. By merging the sample execution data 327, which contains virtual storage addresses and address space IDs, with the information in the mapping data 323, the output file 330 may be used by the flow analysis module to identify the programs (and/or particular portions or functions thereof) that may be responsible for relatively larger portion of the processing burden. Further, because the start and end addresses for each program are included in the mapping data 323, the flow analysis module can determine not only which programs are being executed, but also the amount or percentage of the processing burden that is attributable to particular portions or functions of those programs.

The implementation of the instrumentation module 320 may be nondisruptive to performance and/or execution of the applications/programs being monitored. Once the associated hardware 319 and software 306 are configured, data collection may be performed with no LPAR deactivations or activations. As a result, an initial program load (IPL) may not be required on the system or environment (such as the environment 100 of FIG. 1) in which the instrumentation module 320 is used. In some embodiments, the instrumentation module 320 may be run in multiple LPARs simultaneously. In a z/OS® environment, the functionality of the instrumentation module 320 may correspond to a hardware instrumentation services (HIS) component, which may be configured to set up buffers to store the sample execution data 327. When a number of buffers are filled, the hardware 319 may be configured to generate an interrupt, which can enable the instrumentation module 320 to asynchronously collect the sample execution data 327 and save it to the output file 330. Although illustrated by way of example in FIG. 3 with reference to specific hardware 319 and software 306 functionality, it will be understood that one or more functions of the instrumentation module 320 may be built into the CPU 314 in some embodiments. More generally, it will be understood that the functionality of blocks shown herein may be combined, divided, or eliminated.

Figure 4:
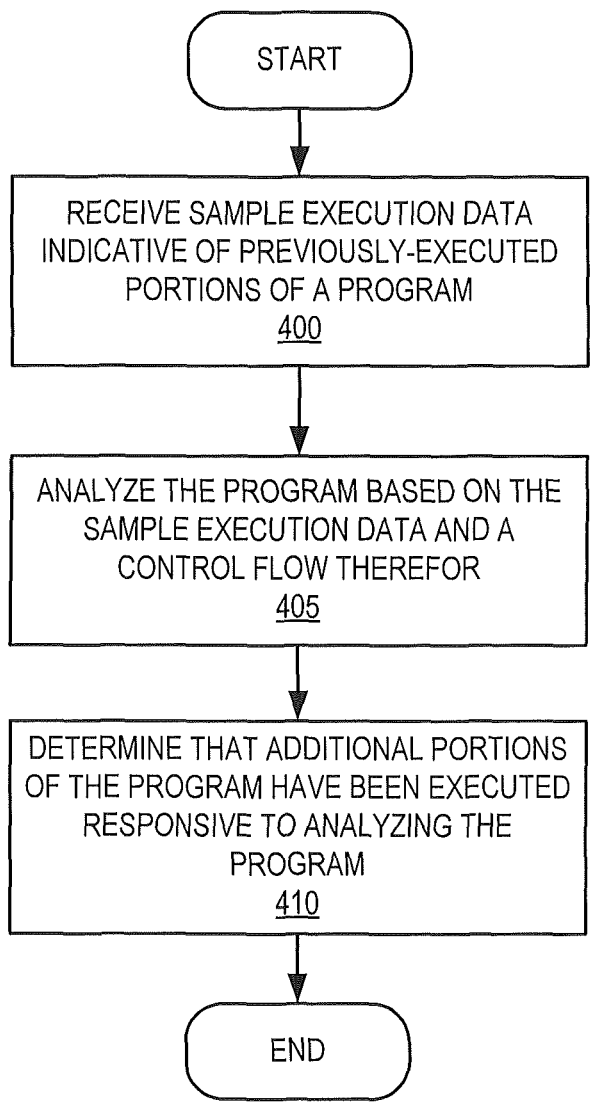
FIGS. 4-6 are flow diagrams that illustrate operations for determining code coverage in accordance with embodiments of the present disclosure.

FIG. 4 is a flowchart illustrating operations for determining code coverage in accordance with an embodiment of the present disclosure. In some embodiments, the operations shown in FIG. 4 may be performed by a flow analysis module or component, such as the flow analysis module 125 of FIG. 1. Referring now to FIG. 4, operations begin at block 400 where sample execution data is received. The sample execution data is indicative of portions of a program (including statements, functions, or other instructions) that have been previously executed. The sample execution data may be received, for example, from instrumentation of a program as collected or gathered by an instrumentation module or component, such as the instrumentation module 120 of FIG. 1, in accordance with a software test suite, such as one of the test suites 111A-111C.

Based on the sample execution data received at block 400, the program is analyzed at block 405. For example, the program may be analyzed based on the ordering or sequence of the instructions indicated by the sample execution data in the overall control flow of the program. As such, it is determined at block 410 that additional portions of the program (which are not indicated by the sample execution data) were necessarily executed responsive to analyzing the program based on the control flow. For example, where the sample execution data indicates that a particular instruction of the program was executed, it may be interpolated, extrapolated, or otherwise determined that (non-branch target) instructions occurring prior to the particular instruction and/or instructions occurring after the particular instruction (but prior to a next branch instruction or sample point) in the control flow of the program must have been executed as well. Non-executable portions of the program (such as data files) may also be distinguished from the executable portions thereof (whether executed or not), and the non-executable portions may be excluded from the analysis. As such, code coverage for the program may be determined without executing (or single stepping) through all portions of the program, thereby reducing the processing burden.

Figure 5:
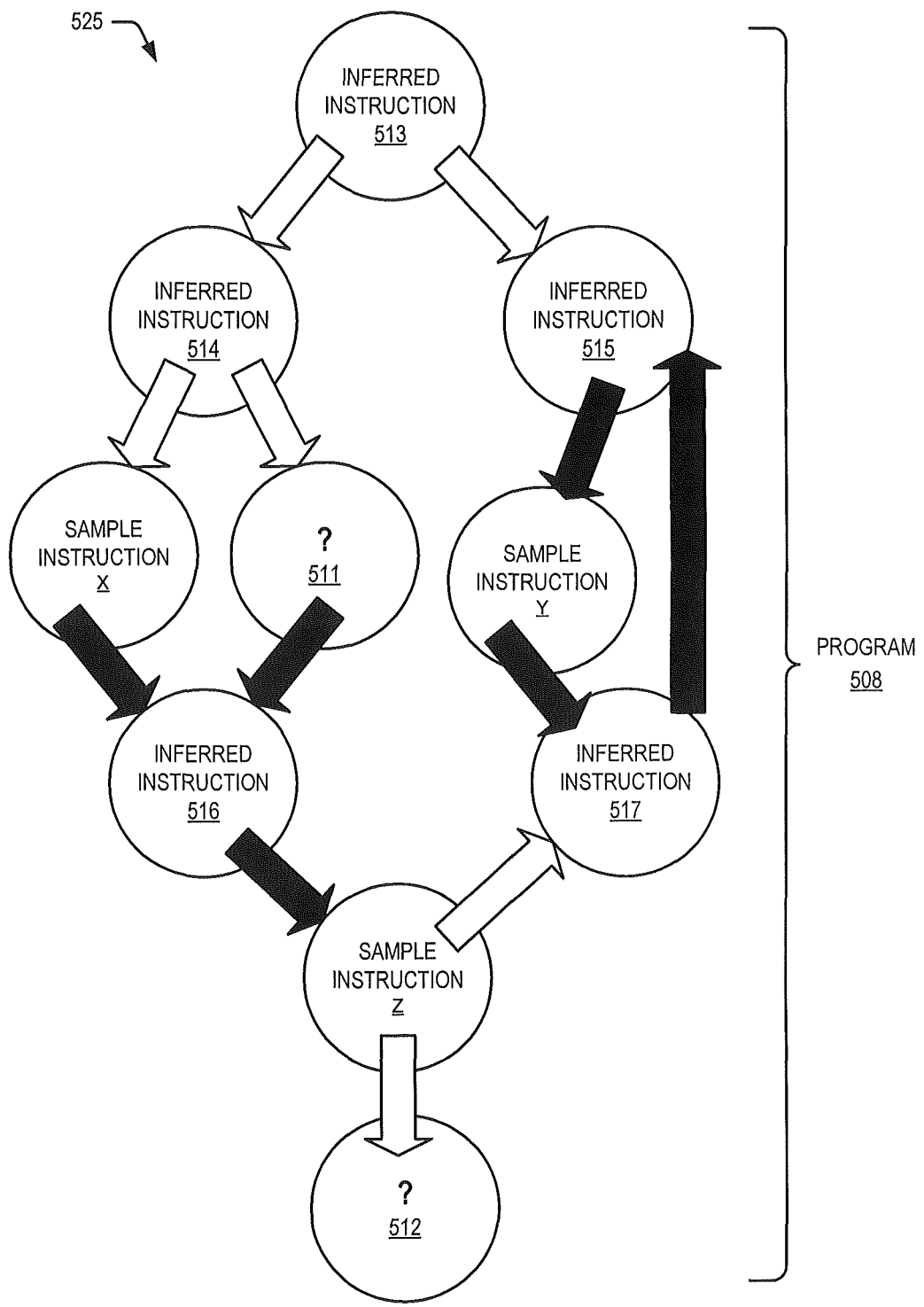

FIG. 5 is a control flow graph illustrating operations for determining code coverage in accordance with some embodiments of the present disclosure. More particularly, FIG. 5 illustrates automated operations performed by a flow analysis module or component, such as the flow analysis module 125 of FIG. 1, in determining the code coverage for a program 508, which may be one of applications/programs 108A-108C, based on a control flow 525 for the program. In the control flow 525, each of the illustrated nodes 511-517 and X-Z represents a portion of program code, for example, one or more statements, functions, or other instructions. The nodes may each represent a basic block, i.e. a straight-line piece of code without any jumps or jump targets, where jump targets start a block, and jumps end a block. The code may be source code, assembly code, or some other sequence of instructions. Directed arrows represent jumps in the control flow. The control flow 525 thereby indicates a sequence or order in which the program instructions/nodes 511-517 and X-Z of the program 508 are executed in the various instructions paths shown.

As shown in FIG. 5, sample execution data received from an instrumentation component (such as the instrumentation module 120 of FIG. 1), indicates or otherwise confirms that instructions X, Y, Z of a program 508 have been previously executed for testing, for example, based on test cases or conditions specified by a code coverage test suite (such as one of the test suites 111A-111C). The sample execution data (such as the sample execution data 327 of FIG. 3) may be included in a file received from the instrumentation component (such as the output file 330), which may also include mapping data (such as the mapping data 323) that identifies the previously-executed instructions X, Y, Z as corresponding to the program 508. The control flow 525 for the program 508 can be requested or otherwise retrieved based on the identification thereof in the mapping data. The control flow 525 is analyzed based on the ordering or sequence of the previously-executed instructions X, Y, Z relative to other instructions in the control flow 525. In other words, the previously-executed instructions X, Y, Z are evaluated in the context of the control flow 525 to determine their relative positions in the overall sequence of instructions of the program 508, including the order in which the previously-executed instructions X, Y, Z are executed relative to other instructions of the program 508.

Based on the positions of the previously-executed instructions X, Y, Z in the control flow 525, it is inferred (for example, by interpolation or extrapolation) or otherwise determined that one or more additional instructions corresponding to nodes 513-517 were also executed, without direct knowledge or confirmation that each particular instruction 513-517 was actually executed. In particular, based on the location or order of the previously-executed instruction X in the left branch of the flow 525, it can be inferred that the preceding instructions 513 and 514 of the left branch must also have been executed (in order for instruction X to have been executed). In addition, as the flow 525 indicates that instruction X is not a branch instruction, it can be inferred that the next instruction 516 in the flow 525 immediately following instruction X (and preceding the next branch instruction Z) was also executed. Similarly, based on the position of sample instruction Y in the right branch of the flow 525, it can be determined that the preceding instructions 513 and 515, as well as the following instruction 517, were executed.

However, in the example of FIG. 5, it cannot be determined that the instruction 512 following sample instruction Z was necessarily executed. In particular, because Z is a branch instruction, it cannot be concluded that instruction 512 (which is a branch target of instruction Z) was necessarily executed based on the position of instruction Z in the flow 525 (as the branch to instruction 517 may have been taken instead). Likewise, it cannot be determined that instruction 511 (which is a branch target of instruction 514) was executed based on the execution of instructions X, Y, or Z, based on their relative positions in the flow 525. As such, the flow analysis module may indicate that all instructions of the program 508 other than branch targets 511 and 512 were executed. It will be understood, however, that embodiments of the present disclosure are in no way limited to the example of FIG. 5, and that the execution of the entirety of the instructions in a control flow may be determined in some embodiments, for example, by increasing the granularity of the sample execution data. For instance, in response to an indication that execution of the instructions 511 and/or 512 cannot be inferred or is otherwise uncertain based on the current sample execution data (indicative of instructions X, Y, Z), the flow analysis module can be configured to request that the instrumentation module increase the granularity of the sample execution data, such that the sample data may include a greater number of previously-executed instructions. As such, the flow analysis module may be configured to control operation of the instrumentation module as needed to increase code coverage.

It should be noted that, as the flow analysis of FIG. 5 can be performed based on sample execution data collected by an external instrumentation component, the code coverage can be determined without modification to the program 508, in contrast to conventional infiltration techniques (whereby instructions are added to the program for use in testing). As such, the program 508 can be tested as-written, allowing for testing of the exact executable that may ultimately be delivered to a customer. Furthermore, the flow analysis of FIG. 5 can be performed in a manner that is non-intrusive (e.g., without interruption or other modification) to the execution of the program 508, in contrast to typical interrupt-recover-mark-resume code coverage techniques, thereby reducing execution time and increasing efficiency with respect to both time and processing burden. As such, the directed flow analysis based on sample execution data described herein may allow for improved code coverage as compared to conventional techniques. Also, if the sample execution data indicates that one or more particular instruction paths have been previously-executed repeatedly and/or at a high frequency, the flow analysis techniques described herein may be used to determine inefficiencies in the corresponding portion of the program.

Figure 6:
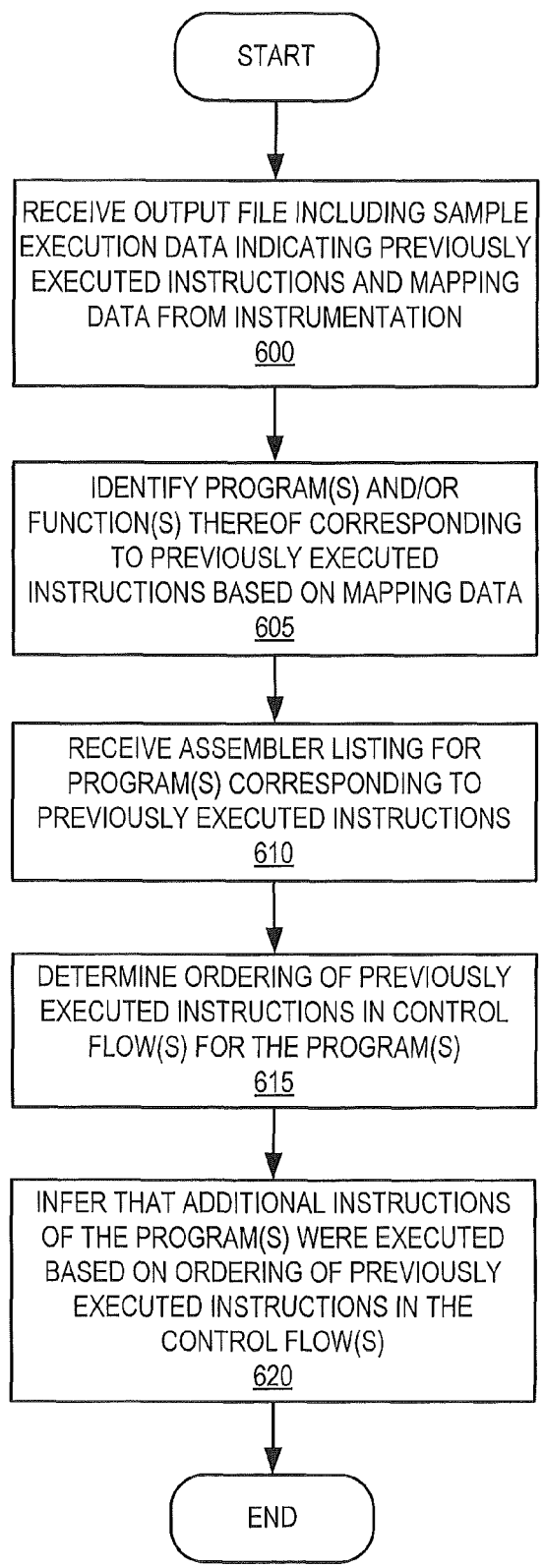

FIG. 6 is a flowchart illustrating operations for determining code coverage in accordance with an embodiment of the present disclosure in greater detail. The operations shown in FIG. 6 may be performed by a flow analysis module or component, such as the flow analysis module 125 of FIG. 1. Referring now to FIG. 6, as a first input, an output file including sample execution and program mapping data is received from an instrumentation module at block 600. The sample execution data is indicative of program instructions that have been previously executed for testing (for example, in accordance with test cases specified by a code coverage test suite), while the mapping data identifies the program(s) corresponding to the previously-executed instructions. For example, in a System Z® and/or z/OS® environment, the output file may be generated by a hardware facility called Hardware Instrumentation Services (HIS), which enables collaboration between the operating system, hypervisor and CPU to generate an output file including sample instruction execution data taken over one or more address spaces in a particular System Z® LPAR. As such, at block 605, the program(s) (and/or particular function(s) thereof) corresponding to the previously-executed instructions are identified based on the mapping data. In the System Z® and/or z/OS® environment, the operating system provides program control section mapping data to align the instructions indicated by the sample execution data to the corresponding programs.

Still referring to FIG. 6, as a second input, the respective assembler listing(s) (or other code indicative of control flow) for the program(s) to be considered (as identified at block 605) are selected and received at block 610. For example, in the System Z® and/or z/OS® environment, many programs/products may be implemented in assembly language. As such, the program(s) identified by the mapping data are analyzed for branch and flow based on the corresponding assembler listing(s), to understand the possible flows through the program(s) and where the previously-executed instructions for each program fit in the flows relative to other instructions therein. In particular, the relative locations or order of execution of the previously-executed instructions in the control flow(s) are determined at block 615. Based on the relative locations of the previously-executed instructions in the control flow(s), it is determined that additional instructions (which are not indicated by the sample execution data) were executed at block 620. In particular, the relative sequence or ordering of the instructions indicated by the sample execution data is used to infer that one or more additional instructions were necessarily executed. In other words, embodiments of the present disclosure use the sample execution data to "fill in the blanks" in a flow where there may not be sample data for particular instructions, but knowledge of the program flow implies that those particular instructions must have executed based on the locations of the sample data in the overall flow. Thus, analysis of the relative proximity of previously-executed instructions in the control flow for a particular program is used to determine that other or additional instructions having an ordering prior to, following, and/or between the previously-executed instructions were also executed, even if such other or additional instructions are not directly exercised or specified by the code coverage test suite.

Accordingly, embodiments of the present disclosure can increase code coverage for a program or software system using the output of an instrumentation component (to collect or gather sample execution data) in combination with program flow analysis (to analyze the sample data in the context of the control flow for the program or software system). Embodiments of the present disclosure can thereby enable a developer or QA engineer to determine how much of a software system has been covered by a set of test cases, without single-stepping through every instruction of the software system, and without modifying the software system and/or execution thereof.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be understood that, although the terms "first", "second", etc. may be used herein to describe various elements or operations, these terms are only used to distinguish one element or operation from another, without limiting the elements or operations. Thus, a first element or operation discussed herein could be termed a second element or operation without departing from the teachings of example embodiments.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of any means or step plus function elements in the claims below are intended to include any disclosed structure, material, or act for performing the function in combination with other claimed elements as specifically claimed.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A method, comprising:

receiving execution data and program mapping data, wherein the execution data is indicative of portions of programs that have been previously executed for testing and comprise previously-executed instructions, wherein the testing comprises test cases that specify execution of the portions of the programs, wherein the execution data does not identify the programs corresponding to the previously-executed instructions, and wherein the program mapping data identifies one of the programs corresponding to one of the previously-executed instructions;

selecting the one of the programs identified by the program mapping data from among the programs;

receiving code indicative of a control flow for the one of the programs;

analyzing the control flow for the one of the programs to identify relative locations in the control flow corresponding to the portions of the one of the programs and determine an ordering of the one of the previously-executed instructions in the control flow, responsive to the execution of the portions of the programs specified by the test cases; and inferring that additional portions of the one of the programs, which comprise additional instructions and are not indicated by the execution data and are not specified by the test cases, have been previously executed in the testing based on the ordering of the previously-executed instructions relative to the additional instructions in the control flow, wherein the inferring is performed without updating the test cases to specify execution of the additional portions of the one of the programs responsive to the analyzing, and wherein the receiving, the selecting, the analyzing, and the inferring comprise operations performed by a processor.

2. The method of claim 1, wherein the previously-executed instructions are collected by dynamic program analysis, wherein the analyzing comprises static program analysis that indicates the ordering of the previously executed instructions in the control flow, and wherein the previously-executed instructions and the additional instructions comprise program code that is to be delivered to a customer.

3. The method of claim 2, wherein the execution data and the program mapping data are included in a file that is received from an instrumentation device that is external to the processor.

4. The method of claim 2, further comprising the following prior to the analyzing:

receiving an assembler listing for the one of the programs identified by the program mapping data, wherein the assembler listing is indicative of the control flow.

5. The method of claim 2, wherein the execution data is further indicative of a frequency of execution of an instruction path including ones of the previously-executed instructions, and further comprising:
  identifying the instruction path as a target for optimization based on the frequency of execution thereof.

6. The method of claim 2, wherein the additional instructions are not branch targets in the control flow.

7. The method of claim 1, wherein the testing indicates code coverage for the one of the programs and is performed without modification of the one of the programs.

8. The method of claim 1, wherein the testing indicates code coverage for the one of the programs and is performed without interrupting execution of the one of the programs.

9. The method of claim 1, wherein the inferring indicates an uncertainty as to execution of another portion of the one of the programs, and further comprising:
  transmitting a request to alter a granularity of the execution data responsive to the uncertainty.

10. The method of claim 1, wherein the one of the programs comprises executable and non-executable portions, and further comprising:
  identifying the non-executable portions of the one of the programs among the executable portions thereof; and
  excluding the non-executable portions of the one of the programs from the analyzing of the one of the programs responsive to the identifying thereof.

11. A computer program product, comprising:
  a computer readable storage medium having computer readable program code embodied in the medium that, when executed by a processor, causes the processor to perform operations comprising:
  receiving execution data and program mapping data, wherein the execution data is indicative of portions of programs that have been previously executed for testing and comprise previously-executed instructions, wherein the testing comprises test cases that specify execution of the portions of the programs, wherein the execution data does not identify the programs corresponding to the previously-executed instructions, and wherein the program mapping data identifies one of the programs corresponding to one of the previously-executed instructions;
  selecting the one of the programs identified by the program mapping data from among the programs;
  receiving code indicative of a control flow for the one of the programs;
  analyzing the control flow for the one of the programs to identify relative locations in the control flow corresponding to the portions of the one of the programs and determine an ordering of the one of the previously-executed instructions in the control flow, responsive to the execution of the portions of the programs specified by the test cases; and
  inferring that additional portions of the one of the programs, which comprise additional instructions and are not indicated by the execution data and are not specified by the test cases, have been previously executed in the testing based on the ordering of the previously-executed instructions relative to the additional instructions in the control flow and without updating the test cases to specify execution of the additional portions of the one of the programs responsive to the analysis.

12. The computer program product of claim 11, wherein the previously-executed instructions are collected by dynamic program analysis, wherein the analyzing comprises static program analysis that indicates the ordering of the previously executed instructions in the control flow, and wherein the previously-executed instructions and the additional instructions comprise program code that is to be delivered to a customer.

13. The computer program product of claim 12, wherein the execution data and the program mapping data are included in a file that is received from an instrumentation device that is external to the processor.

14. The computer program product of claim 12, wherein, prior to the analyzing, the computer readable program code further causes the processor to perform operations comprising:
  retrieving an assembler listing for the one of the programs identified by the program mapping data, wherein the assembler listing is indicative of the control flow.

15. The computer program product of claim 12, wherein the additional instructions are not branch targets in the control flow.

16. The computer program product of claim 11, wherein the testing indicates code coverage for the one of the programs without modification of the one of the programs.

17. The computer program product of claim 11, wherein the testing indicates code coverage for the one of the programs without interrupting execution of the one of the programs.

18. A computer system, comprising:
  a processor; and
  a memory coupled to the processor, the memory comprising computer readable program code embodied therein that, when executed by the processor, causes the processor to:
  receive execution data and program mapping data, wherein the execution data is indicative of portions of a program that have been previously executed for testing and comprise previously-executed instructions, wherein the testing comprises test cases that specify execution of the portions of the programs, wherein the execution data does not identify the programs corresponding to the previously-executed instructions, and wherein the program mapping data identifies one of the programs corresponding to one of the previously-executed instructions:
  select the one of the programs identified by the program mapping data from among the programs;
  receive code indicative of a control flow for the one of the programs;
  analyze the control flow for the one of the programs to identify relative locations in the control flow corresponding to the portions of the one of the programs and determine an ordering of the one of the previously-executed instructions in the control flow, responsive to the execution of the portions of the programs specified by the test cases; and
  infer that additional portions of the one of the programs, which comprise additional instructions and are not indicated by the execution data and are not specified by the test cases, have been previously executed in the testing based on the ordering of the previously-executed instructions relative to the additional instructions in the control flow and without updating the test cases to specify execution of the additional portions of the one of the programs responsive to the analysis.

19. The computer system of claim 18, wherein the previously-executed instructions are collected by dynamic program analysis, wherein analysis of the control flow comprises static program analysis that indicates the ordering of the previously executed instructions in the control flow, and wherein the previously-executed instructions and additional instructions comprise program code that is to be delivered to a customer.

20. The computer system of claim 19, wherein the execution data and the program mapping data are included in a file that is generated by an instrumentation device that is external to the processor.

21. The computer system of claim 19, wherein the memory further comprises computer readable program code that, when executed by the processor, causes the processor to:
    retrieve an assembler listing for the one of the programs identified by the program mapping data, wherein the assembler listing is indicative of the control flow.

22. The computer system of claim 19, wherein the additional instructions are not branch targets in the control flow.

23. The computer system of claim 18, wherein the testing indicates code coverage for the one of the programs and is performed without modification of the one of the programs.

24. The computer system of claim 18, wherein the testing indicates code coverage, for the one of the programs and is performed without interrupting execution of the one of the programs.

25. The computer system of claim 18, wherein the memory further comprises computer readable program code that, when executed by the processor, causes the processor to:
    transmit a request to alter a granularity of the execution data responsive to determination of an uncertainty as to execution of another portion of the one of the programs.

* * * * *